United States Patent Office 2,817,626
Patented Dec. 24, 1957

2,817,626

PROCESS OF ACTIVATING HYDROCRACKING CATALYSTS WITH HYDROGEN

Lloyd C. Mabry, Jr., and John W. Myers, Bartlesville, Okla., assignors to Phillips Petroleum Company, a corporation of Delaware No Drawing. Application August 27, 1953, Serial No. 376,962

28 Claims. (Cl. 196—53)

This invention relates to a method for activating a hydrocracking and reforming catalyst to improve its activity, to the catalyst activated by the process, and to the hydrocracking and reforming of hydrocarbons in contact with said catalyst.

Hydrocracking is commonly employed on heavy residual or distillate oils for the production of substantial yields of low boiling saturated products, such as gasoline, intermediate distillates which may be utilized as domestic fuels, and to some extent still heavier cuts suitable for use as lubricants. In these hydrocracking processes, cracking and hydrogenation reactions take place simultaneously. Hydrocracking, as distinguished from simple hydrogenation wherein only the addition of hydrogen to unsaturated bonds takes place, is cracking under hydrogenation conditions so that products of the cracking reaction are substantially more saturated than when free hydrogen is not present during the reaction. A very effective catalyst for hydrocracking reactions comprises iron oxide in combination with an oxide of a metal of the group consisting of the oxides of Mo, Cr, W, U, and V supported on a carrier material of alumina, which may also advantageously contain silica. Bauxite, halogen-treated alumina, alumina gel, and various activated aluminas from natural and synthetic sources are good supporting materials for the catalyst. Catalysts of this type, while quite effective, leave room for improvement in activity, effective life, efficiency, per pass conversion rate, stability to regeneration, etc.

The principal object of the invention is to provide an activation process for a hydrocracking and reforming catalyst which produces an improved catalyst for hydrocracking and reforming of hydrocarbons. Another object of the invention is to provide improved catalysts which have higher activity for the reforming and hydrocracking of hydrocarbons. It is also an object of the invention to provide an improved process for the hydrocracking of hydrocarbons. A further object is to provide an improved combination process for alternately hydrogenating or dehydrogenating a hydrocarbon fraction, such as reforming a naphthene hydrocarbon, and hydrocracking a relatively heavy hydrocarbon fraction such as a gas oil. Other objects of the invention will become apparent from a consideration of the accompanying disclosure.

In the practice of the invention, a hydrocracking catalyst comprising iron oxide in combination with an oxide of a metal selected from groups 5A or 6A of the periodic table supported on a suitable carrier, preferably one containing alumina, is subjected to heating in hydrogen at a temperature above 1200° F. for a period of at least one-half hour. The activation is expedited by an increase in temperature above 1200° F., but should not be sufficient to effect deterioration of the catalyst. A catalyst of the composition described, treated with hydrogen at a temperature below about 1200° F., is very effective for hydrogenation or dehydrogenation of hydrocarbons, but exhibits very little hydrocracking activity. The hydrogen ambient should be substantially pure and free from catalyst poisons, but minor proportions of relatively difficultly adsorbable compounds such as methane or nitrogen can be tolerated. The pressure of the hydrogen may be any that is convenient, such as atmospheric or higher. The period of activation required is generally at least one-half hour and a longer period is usually more effective. The optimum activation period varies with different compositions within the scope of the disclosed catalyst and also with the activating temperature utilized and may be readily determined by trial.

Any reasonable proportions of the catalyst constituents may be formed into a catalyst composite which can be activated by the activation treatment of the invention to produce a catalyst having higher hydrocracking activity than a catalyst consisting of the same constituents which have not been activated in hydrogen at a temperature above 1200° F. A preferred catalyst consists essentially of 0.5 to 20 weight percent ferric oxide, 2 to 30 weight percent molybdenum trioxide, and the remainder a suitable support, such as alumina or alumina containing a minor amount of silica. A preferred specific catalyst composition consists of 3 weight percent ferric oxide, 8 weight percent molybdenum oxide, 5 weight percent silica, and 84 weight percent alumina. The catalyst treated in accordance with the invention may be prepared by a variety of methods conventional in the art. One preferred method comprises impregnation of an alumina-silica carrier with ferric nitrate, drying and calcining the composite, impregnation of the resulting composite with ammonium molybdate, and redrying and recalcining the composite. The carrier, in the form of powder, granules, or pellets, may be immersed in a solution of suitable soluble salts of the desired metals, whereupon the carrier, or support, absorbs a portion of the solution. Another method by which the catalyst may be made involves coprecipitation of the hydrated oxide, or oxides, of the carrier and the catalytic agents from a solution containing calculated amounts of the suitable soluble salts of the carrier materials and the metals employed as catalytic agents. When preparing the catalyst composite by impregnation of an alumina or silica-alumina carrier in the form of powder, granules, or pellets, it is preferred to first impregnate the carrier with a decomposable iron salt followed by impregnation of the iron-containing carrier with one or more metal salts of the metals of groups 5A or 6A. However, the carrier material may be impregnated in the reverse order, or simultaneous impregnation may be utilized. After impregnation, the impregnated carrier is dried and heated at a temperature in the range of 400 to 900° F., or higher, for a period of at least three hours. The calcination step is usually performed by heating the impregnated material in an oxygen-containing atmosphere at a temperature in the range of 800 to 1150° F., and preferably 900 to 1100° F., for a period of at least three hours, and preferably longer. If the catalyst is not in suitable form for contacting operations, it may be comminuted, admixed with Sterotex or other suitable binders or other lubricants, and heated so as to remove the Sterotex.

The catalyst described, when treated with hydrogen at a temperature above about 1200° F. in accordance with the invention, is particularly active in the hydrocracking of suitable hydrocarbon fractions under conditions of temperature, pressure, and reaction time within conventional ranges, such as 800 to 1200° F., 250 to 5000 p. s. i., 0.5 to 5 liquid hourly space velocity, and hydrogen flow of 100 to 500 cubic feet per barrel of reactants. The catalyst composite, when treated with hydrogen at a temperature below about 120° F., may also be used to advantage in the dehydrogenation and hydrogenation of hydrocarbons within conventional ranges of reaction conditions. It is advantageous to activate the catalyst composite by heating the same in a hydrogen ambient at a temperature below about 1200° F., then reforming a naphtha over the activated catalyst at a temperature below about 1200° F., and thereafter burning off the accumulated carbon and activating the catalyst with hydrogen at a temperature above 1200° F., and hydrocracking a gas oil or other petroleum fraction with the activated catalyst. The catalyst may again be used for hydrogenation or dehydrogenation, including reforming, after oxidation of the carbonaceous material deposited thereon during the hydrocracking reaction and after treatment with hydrogen at a temperature below 1200° F. The carbonaceous material may be removed in conventional manner in an oxygen-containing ambient at an elevated temperature.

The chemical and/or physical aspects of the catalyst of the invention which account for its hydrocracking activity are not known but it is certain that some definite change in the character of the catalyst occurs when it is activated at a temperature substantially above 1200 F. as compared with a catalyst containing the same constituents but activated at a temperature substantially below 1200° F.

The following specific example is presented in order to illustrate the invention and is not to be interpreted as unnecessarily limiting the invention.

EXAMPLE

A catalyst of a composition of 8 weight percent molybdenum trioxide, 3 weight percent ferric oxide, 5 weight percent silica, and 84 weight percent alumina was prepared by impregnating 215.3 grams of commercially available silica-alumina pellets with ferric nitrate by immersion of the pellets in a 200 milliliter solution containing 68.4 grams of ferric nitrate nonahydrate. The resulting impregnated material was drained, dried at 230° F. for 12 hours, and calcined at 1050° F. for 5 hours. An 83.4-gram portion of these calcined pellets was then immersed in a 200 milliliter solution containing 65.7 grams of ammonium molybdate heptahydrate and 70 milliliters of 28 to 30 percent aqueous ammonia. The resulting impregnated material was then drained, dried at 230° F. for 12 hours, and calcined at 900° F. for about 16 hours. The resulting catalyst was tested for the dehydrogenation of cyclohexane after treatment in an atmosphere of cylinder hydrogen at a temperature of 1100° F., and then for the hydrocracking of cyclohexane after regeneration in an oxygen-containing atmosphere and treatment in an ambient of cylinder hydrogen at a temperature of 1300° F. The data obtained in the runs are presented in the table.

Table

| Pretreatment, $H_2$: | | |
|---|---|---|
| Temperature, °F | 1,100 | 1,300 |
| Time, hours [a] | 1.75 | 2.0 |
| Reaction Conditions: | | |
| Temperature, °F, Average | 891 | 901 (initial)[b] |
| Pressure, p. s. i. g | 300 | 300 |
| $H_2$/Feed, mol | 6 | 6 |
| LHSV | 1 | 1 |
| Aromatic Yield, Weight Percent (NLB) | 27.1 | |
| Residue Gas Analysis, Volume Percent: | | |
| $H_2$ | 96.6 | 50.5 |
| $C_1$ | 3.0 | 47.4 |
| $C_2$ | 0.2 | 1.3 |
| $C_3$ | 0.1 | 0.5 |
| $C_4$ | 0.1 | 0.3 |
| Total | 100.0 | 100.0 |

[a] The catalysts were cooled to the run temperature in hydrogen.
[b] Reactor temperature rose sharply to above 1200° F.

It can be seen from the data presented in the table that the catalyst treated at 1100° F. in hydrogen was very effective for dehydrogenation and that the catalyst, when activated in hydrogen at 1300° F., was also very effective for hydrocracking.

We claim:

1. The process for activation of a catalyst comprising an activated alumina support having deposited thereon iron oxide and at least one oxide of a metal of the group consisting of Mo, Cr, W, U, and V to improve its activity for hydrocracking of relatively heavy hydrocarbons, which comprises heating said catalyst in a hydrogen-containing ambient free of catalyst poisons at a temperature above 1200° F., but below that at which deterioration of the catalyst occurs, for a period of at least one-half hour.

2. The process of claim 1 in which the catalyst contains molybdenum oxide.

3. The process of claim 1 in which the catalyst contains chromium oxide.

4. The process of claim 1 in which the catalyst contains tungsten oxide.

5. The process of claim 1 in which the catalyst contains uranium oxide.

6. The process of claim 1 in which the catalyst contains vanadium oxide.

7. A catalyst comprising a minor proportion of iron oxide and a minor proportion of at least one oxide of the group consisting of the oxides of Mo, Cr, W, U, and V deposited on a support or carrier, said catalyst having been activated by heating in a hydrogen-containing ambient at a temperature above 1200° F., but below that at which deterioration of the catalyst occurs, for a period of at least one-half hour.

8. The catalyst of claim 7 in which the support or carrier comprises principally alumina.

9. The catalyst of claim 8 in which the support or carrier also contains a minor amount of silica.

10. The catalyst of claim 7 containing iron oxide in the range of 0.5 to 20 weight percent and an oxide of said group in the range of 2 to 30 weight percent deposited on an alumina-containing support.

11. The catalyst of claim 10 containing molybdenum oxide.

12. The catalyst of claim 10 containing chromium oxide.

13. The catalyst of claim 10 containing tungsten oxide.

14. The catalyst of claim 10 containing uranium oxide.

15. The catalyst of claim 10 containing vanadium oxide.

16. A process for hydrocracking a hydrocrackable hydrocarbon which comprises contacting said hydrocarbon under hydrocracking conditions including a temperature in the range of 800 to 1200° F. with a catalyst containing a minor amount of iron oxide and at least one oxide of the group consisting of the oxides of Mo, Cr, W, U, and V deposited on an alumina-containing support, said catalyst having been activated by heating in a hydrogen-containing ambient at a temperature above 1200° F., but below that at which deterioration of the catalyst occurs, for at least one-half hour.

17. The process of claim 16 in which the alumina support contains a minor amount of silica.

18. The process of claim 17 in which the catalyst contains molybdenum oxide.

19. A process for the conversion of hydrocarbons which comprises contacting a hydrocarbon fraction under dehydrogenating conditions with a catalyst containing a minor amount of iron oxide and at least one oxide of the group consisting of the oxides of Mo, Cr, W, U, and V deposited upon an alumina-containing support, said catalyst having been activated by heating in a hydrogen-containing ambient free of catalyst poisons at a temperature substantially below 1200° F. for at least one-half hour, thereafter heating said catalyst in a hydrogen-containing ambient free of catalyst poisons at a temperature substantially above 1200° F. for at least one-half hour so as to render said catalyst active for hydrocracking, contacting the resulting hydrocracking catalyst with a hydrocrackable hydrocarbon fraction under hydrocracking conditions including a temperature in the range of 800 to 1200° F., and recovering the hydrocarbon effluents from the reactions.

20. The process of claim 17 in which the catalyst contains chromium oxide.

21. The process of claim 17 in which the catalyst contains tungsten oxide.

22. The process of claim 17 in which the catalyst contains uranium oxide.

23. The process of claim 17 in which the catalyst contains vanadium oxide.

24. The process of claim 19 in which the alumina support contains a minor amount of silica and the selected metal oxide comprises molybdenum oxide.

25. The process of claim 19 in which the alumina support contains a minor amount of silica and the selected metal oxide comprises chromium oxide.

26. The process of claim 19 in which the alumina support contains a minor amount of silica and the selected metal oxide comprises tungsten oxide.

27. The process of claim 19 in which the alumina support contains a minor amount of silica and the selected metal oxide comprises uranium oxide.

28. The process of claim 19 in which the alumina support contains a minor amount of silica and the selected metal oxide comprises vanadium oxide.

References Cited in the file of this patent

UNITED STATES PATENTS

| | | |
|---|---|---|
| 2,487,564 | Layng | Nov. 8, 1949 |
| 2,496,343 | Gillespie | Feb. 7, 1950 |
| 2,658,858 | Lang et al. | Nov. 10, 1953 |
| 2,687,370 | Henricks | Aug. 24, 1954 |

U. S. DEPARTMENT OF COMMERCE
PATENT OFFICE

CERTIFICATE OF CORRECTION

Patent No. 2,817,626                                                                  December 24, 1957

Lloyd C. Mabry, Jr., et al.

It is hereby certified that error appears in the printed specification of the above numbered patent requiring correction and that the said Letters Patent should read as corrected below.

Column 2, line 69, for "120° F." read -- 1200° F. --.

Signed and sealed this 15th day of April 1958.

(SEAL)
Attest:
KARL H. AXLINE
Attesting Officer

ROBERT C. WATSON
                                                                 Commissioner of Patents